United States Patent

Bailey et al.

[15] 3,691,497

[45] Sept. 12, 1972

[54] LEADLESS MICROMINIATURE INDUCTANCE ELEMENT WITH A CLOSED MAGNETIC CIRCUIT

[72] Inventors: John P. Bailey, Atlanta, Ga.; William L. Muckelroy, Washington, D.C.

[73] Assignee: The United States of America as represented by the Secretary of the Army

[22] Filed: Oct. 15, 1970

[21] Appl. No.: 80,851

[52] U.S. Cl. ....................336/192, 336/200, 336/212

[51] Int. Cl...........................H01f 15/10, H01f 27/26

[58] Field of Search..............336/192, 200, 221, 212; 317/101 CC

[56] References Cited

UNITED STATES PATENTS

| | | | |
|---|---|---|---|
| 3,344,237 | 9/1967 | Gregg | 336/200 X |
| 3,085,899 | 4/1963 | Forman | 336/200 UX |
| 3,191,136 | 6/1965 | Connell et al | 336/200 X |

*Primary Examiner*—Thomas J. Kozma
*Attorney*—Edward J. Kelly, Herbert Berl, Harry M. Saragovitz and Saul Elbaum

[57] ABSTRACT

A Microminiature leadless inductance element having a closed magnetic loop. The inductance element comprises a conventional U-shaped ferromagnetic core having a wire winding around its center. Grooves are provided at the underside of the feet of the U-shaped core so as to receive the terminal portions of the wire winding. The grooves are coated with an electrical conductor and a similar electrically conductive coating is provided on the substrate such that an electrical connection is made without the use of soldering wires. A closed magnetic loop is achieved by applying a ferromagnetic coating along a portion of the substrate surface such that when the U-shaped core is placed on the substrate, all the flux lines generated within the core are conducted through the ferromagnetic coating on the substrate. This eliminates stray flux lines and materially enhances the Q of the system.

18 Claims, 2 Drawing Figures

PATENTED SEP 12 1972

3,691,497

INVENTORS,
JOHN P. BAILEY
WILLIAM L. MUCKELROY

BY Harry M. Saragovitz
Edward J. Kelly
Herbert Berl
Saul Elbaum
ATTORNEYS

LEADLESS MICROMINIATURE INDUCTANCE ELEMENT WITH A CLOSED MAGNETIC CIRCUIT

RIGHTS OF THE GOVERNMENT

The invention described herein may be manufactured, used, and licensed by or for the United States Government for governmental purposes without the payment to me of any royalty thereon.

BACKGROUND OF THE INVENTION

This invention relates to microminiature inductance elements, and more particularly to a leadless microminiature inductance element of the type disclosed in copending application Ser. No. 29,191, filed Apr. 16, 1970, having a closed magnetic loop for use as a chip on a substrate pattern.

In the manufacture and assembly of microminiature circuits for use on substrate patterns it is desirable that all the electrical elements which are mounted on the substrate be in the form of leadless inverted devices (LID), commonly known as chips. The use of such chips makes it possible to employ a numerically controlled automatic bonding tool for providing complete and automatic fabrication of these microminiature circuits. Electrical elements such as capacitors, resistors, transistors and diodes are generally available in microminiature chip form for use on substrates; however, a great deal of difficulty has been encountered in producing electrical inductors in microminiature chip form. In the prior art, the process of attaching and mounting inductors to microminiature substrates has usually required that the two terminal portions of wire from the inductor be separately and individually soldered to the substrate pattern. This individual treatment of inductors is inefficient and extremely time consuming.

A secondary problem exists in that conventional microminiature inductance elements are usually of the open ended variety. This creates an open ended magnetic field in which field lines developed within the inductance element escape outside the inductance element and interacts with adjacent conductors or other metal objects in the immediate vicinity of the inductance. The result is that the stability and Q of such an element is significantly reduced.

It is therefore a primary object of this invention to provide an inductor in the form of a microminiature chip.

It is another object of this invention to provide a leadless inductance element having a closed magnetic loop.

Still another object of the invention is to provide a leadless inductance element which may be bonded to a printed circuit by using an automated bonding tool.

Yet another object of the invention is to eliminate or materially reduce the stray flux lines developed within a microminiature inductance element.

Yet another object of the invention is to enhance the stability and Q of a microminiature inductance element for use in microcircuits.

SUMMARY OF THE INVENTION

Briefly, in accordance with this invention, a closed magnetic loop inductance element comprises a core having at least first and second feet and a wire winding surrounding a portion of the core. A substrate for receiving and supporting the core is provided along a portion of its surface with a coating capable of conducting a magnetic field which is developed within the core. The coating has sufficient surface area to cover the feet of the core and thereby to receive the entire magnetic field developed within the core. More specifically, a U-shaped or H-shaped ferromagnetic core is utilized in conjunction with a ferromagnetic coating on the substrate surface. Additionally, an electrically conductive coating is also provided along a portion of the underside of each of the feet and a similar electrically conductive coating is provided on the surface of the substrate in alignment with the electrically conductive coating at the underside of the core. In order to eliminate soldering of wires to the substrate, a groove is located along a portion of the underside of each of the feet such as to receive the two terminal portions of the wire winding. The electrically conductive coating at the underside of each of the feet extends into the groove to make electrical contact with the wire winding.

BRIEF DESCRIPTION OF THE DRAWINGS

The specific nature of the invention as well as other objects, aspects, uses and advantages thereof will clearly appear from the following description and from the accompanying drawing in which.

DESCRIPTION OF THE PREFERRED EMBODIMENTS

Figure 1:
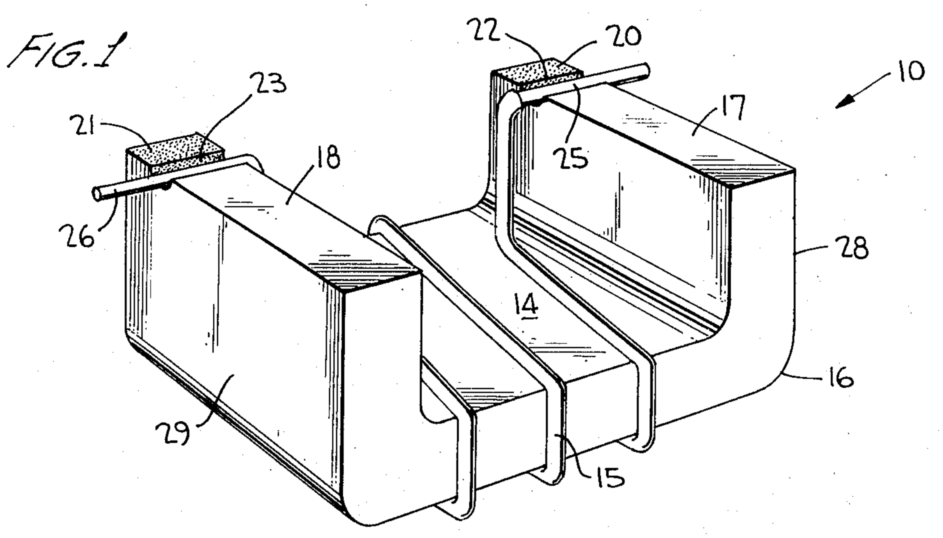
FIG. 1 is a perspective view illustrating the bottom portion of an inductance element in accordance with this invention.

Referring now to FIG. 1, inductance element 10 comprises a U-shaped core 14 having at least two upright feet 28 and 29 which terminate into flattened surfaces 17 and 18. In actual use, flattened surfaces 17 and 18 serve as the underside portions of feet 28 and 29 and support the inductance element in an upright position on a substrate as illustrated in FIG. 2.

Referring back to FIG. 1, grooves 22 and 23 are provided at a portion of the underside of feet 28 and 29 and are adapted to receive the terminal portions 25 and 26 of wire winding 15. An electrically conductive coating 20 and 21 covers a portion of the underside of each of feet 28 and 29 and extends into grooves 22 and 23 in order to make electrical contact with terminal portions 25 and 26 of wire 15.

Figure 2:
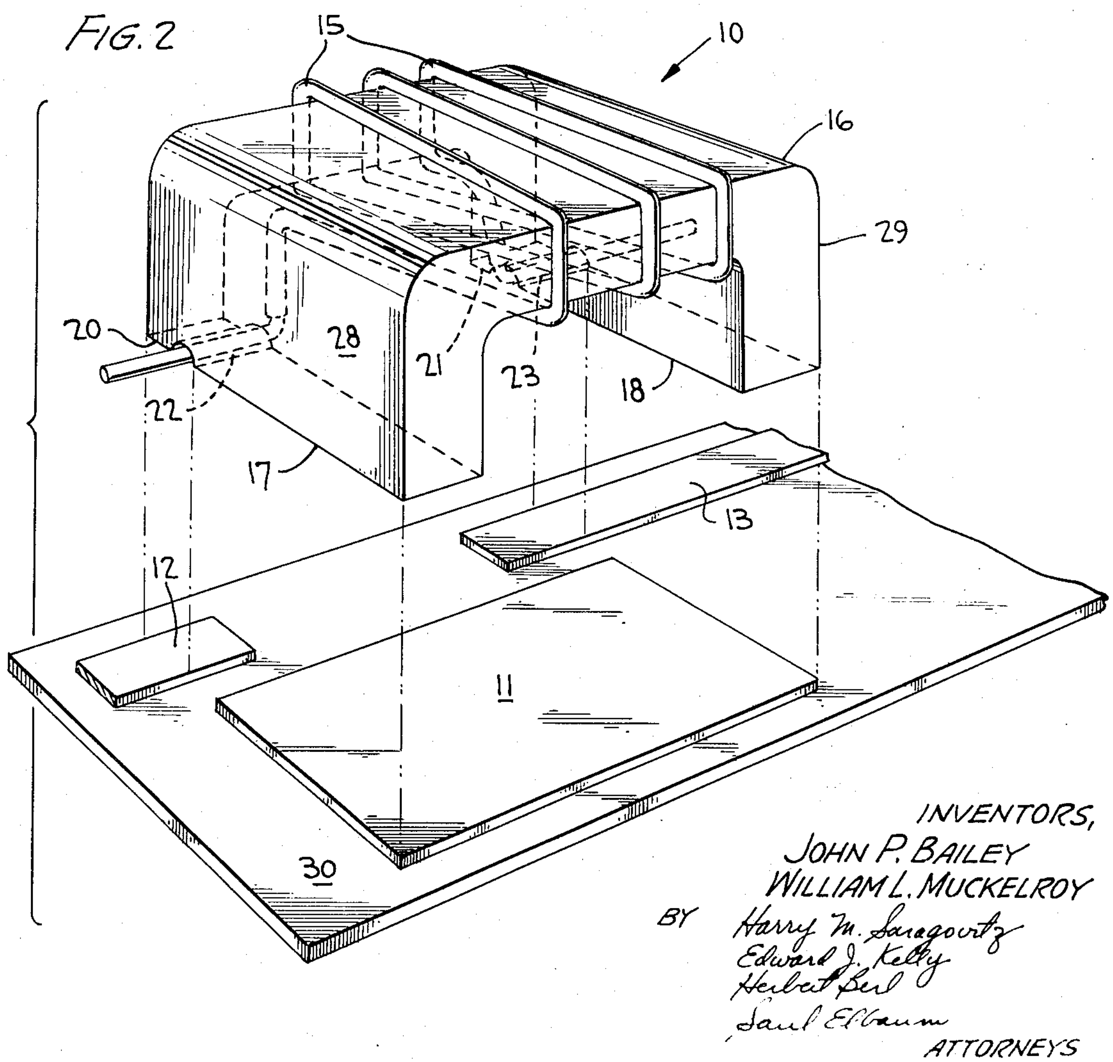
FIG. 2 is a perspective view illustrating the top portion of the inductance element together with the substrate in accordance with this invention.

Referring now to FIG. 2, inductance element 10 is shown in its conventional upright position ready to be placed upon substrate 30. Substrate 30 is a conventional substrate capable of supporting a plurality of microminiature circuit elements. These are of the conventional thick or thin film printed microcircuits. A ferromagnetic coating 11 is placed along a portion of the surface area of substrate 30 and has sufficient surface area to cover the underside surfaces 17 and 18 of magnetic core 10. When feet 28 and 29 of core 10 are firmly placed upon ferromagnetic surface 11, a closed magnetic loop is achieved. Any magnetic field lines developed within the core of inductance element 10 will travel through feet 28 and 29 and traverse ferromagnetic coating 11. Accordingly, it will be appreciated that the magnetic flux lines will remain substantially confined to this somewhat circular path, with very little if any of the magnetic field escaping outside of its predetermined path.

Electrically conductive coatings 12 and 13 are provided on the surface of substrate 30 and are placed adjacent to the ferromagnetic coating 11 such that when the inductance element 10 is placed upon the substrate, the electrically conductive coatings 20 and 21 at the underside of the inductance element align with the corresponding electrically-conducting conductive elements 12 and 13. With inductance element 10 properly placed on the surface of substrate 30, electrically-conductive coatings 20 and 21 on the inductance element will make contact with electrically conductive coatings 12 and 13 on the substrate. Simultaneously, the undersides 17 and 18 of inductor 10 will be located on top of ferromagnetic coating 11 such that all the flux lines developed within element 10 are caused to be conducted through coating 11.

In order to further eliminate loss of flux lines, core 10 has been provided with circular bends 16 which increase the quality factor ($Q$) of the inductance element. The $Q$ of an inductor is a measure of its ability to respond to certain frequencies. It is calculated by the formula $Q=X/R$ where $X$ is the inductive reactance and $R$ is the resistance of the core. The $Q$ can also be expressed as the ratio of the energy stored in the electromagnetic field to the energy dissipated. Some of the factors which affect the $Q$ are: losses in the windings, losses in the core such as residual, hysteresis, eddy current losses and the proximity of conducting surfaces. The last of these has the greatest effect on an inductor of the type herein described.

The maximum theoretical $Q$ for a given inductor occurs when the coil losses equal the core losses. This is because the $Q$ of the coil varies directly with the permeability while the $Q$ of the core varies inversely with the permeability. Test results of an embodiment of the invention herein described have produced a doubling of the $Q$ factor as well as an increase in inductance of up to 20 percent.

Ferromagnetic coating 11 maybe any conventional material capable of conducting a magnetic field. One such material is described in Journal of Applied Physics, vol. 32, 1961. It is generally well known in the art that epitaxial magnetic oxide films as well as epitaxial ferrites can be produced routinely, one method for doing so being a chemical vapor deposition (CVD) technique. Also, the entire substrate 30 can be made of ferromagnetic dielectric material.

It should be understood that while one specific embodiment has been described, numerous variations can be made within the scope of the appended claims. Thus, the core 10 can be any ferrite core having an H shape or a U shape. Similarly, either thick film or a thin film techniques may be employed in conjunction with the invention. Accordingly, we do not desire to be limited to the exact details of construction shown and described, for obvious modifications will occur to persons skilled in the art.

We claim:

1. A circuit element with a closed magnetic loop comprising a core having at least first and second feet, a wire winding surrounding a portion of said core, a substrate for supporting said core, a coating located along a portion of said substrate for conducting a magnetic field developed in said core, an electrically conductive coating located along a portion of the underside of each of said feet, and an electrically conductive coating on the surface of said substrate in alignment with the coating of said feet.

2. The device of claim 1 further comprising a groove located along a portion of the underside of each of said feet for receiving the two terminal portions of said wire winding.

3. The device of claim 2 wherein said electrically conductive coating at said feet extend into said groove.

4. A circuit element with a closed magnetic loop comprising;

a. a solitary and non-planar core having at least first and second supporting feet;
b. a conductive winding surrounding a portion of said core;
c. A substrate for supporting said core; and
d. a magnetically permeable coating located along a portion of said substrate and directly beneath the underside of said supporting feet for conducting a magnetic field developed in said core.

5. A circuit element with a closed magnetic loop comprising a solitary and non-planar core having at least first and second supporting feet, a conductive winding surrounding a portion of said core, a substrate for supporting said core, a magnetically permeable coating located along a portion of said substrate for conducting a magnetic field developed in said core, said coating having sufficient surface area to receive the entire magnetic field within said core, a first electrically conductive coating located along a portion of the underside of each of said feet, and a second electrically conductive coating located on the surface of said substrate in alignment with said first electrically conductive coating.

6. The device of claim 5 further comprising a groove located along a portion of the underside of each of said feet for receiving the two terminal portions of said conductive winding.

7. The device of claim 6 wherein said electrically conductive coating at said feet extend into said groove.

8. A circuit element with a closed magnetic loop comprising a solitary and non-planar core having at least first and second supporting feet, a conductive winding surrounding a portion of said core, a substrate for supporting said core, a magnetically permeable coating located along a portion of said substrate for conducting a magnetic field developed in said core, said coating having sufficient surface area to receive the entire magnetic field within said core, a first electrically conductive coating located along a portion of the underside of each of said feet, a second electrically conductive coating on the surface of said substrate in alignment with said first electrically conductive coating, a groove located along a portion of the underside of each of said feet for receiving the two terminal portions of said conductive winding, wherein said first electrically conductive coating extends into said groove, and wherein said winding is attached to said core.

9. The device of claim 8 wherein said core further comprises at least two opposite magnetic poles formed into supporting feet each juxtaposed to a portion of said magnetically permeable coating.

10. The device of claim 8 wherein said core comprises an H-shaped magnetically permeable material.

11. The device of claim 8 wherein said core comprises a U-shaped magnetically permeable material.

12. The device of claim 4 further comprising an electrically conductive coating located along a portion of the underside of each of said feet and an electrically conductive coating on the surface of said substrate in alignment with the coating of said feet.

13. The device of claim 12 further comprising a groove located along a portion of the underside of each of said feet for receiving the two terminal portions of said conductive winding.

14. The device of claim 13 wherein said electrically conductive coating at said feet extend into said groove.

15. The device of claim 13 wherein said winding is attached to said core.

16. The device of claim 15 wherein said core further comprises at least two opposite magnetic poles formed into supporting feet each one opposed to a portion of said magnetically permeable coating.

17. The device of claim 16 wherein said core comprises an H-shaped magnetically permeable material.

18. The device of claim 16 wherein said core comprises a U-shaped magnetically permeable material.

* * * * *